US012421086B1

(12) United States Patent
Li et al.

(10) Patent No.: US 12,421,086 B1
(45) Date of Patent: Sep. 23, 2025

(54) ENERGY-SAVING HOOK FIXING DEVICE FOR CRANE

(71) Applicant: Xuzhou College of Industrial Technology, Xuzhou (CN)

(72) Inventors: Jiansong Li, Xuzhou (CN); Wenqi Song, Xuzhou (CN); Jinhai Sun, Xuzhou (CN)

(73) Assignee: Xuzhou College of Industrial Technology, Xuzhou (CN)

( * ) Notice: Subject to any disclaimer, the term of this patent is extended or adjusted under 35 U.S.C. 154(b) by 0 days.

(21) Appl. No.: 19/214,687

(22) Filed: May 21, 2025

(30) Foreign Application Priority Data

Jun. 4, 2024 (CN) ......................... 202410714112.7

(51) Int. Cl.
*B66C 23/88* (2006.01)
*B66C 13/12* (2006.01)

(52) U.S. Cl.
CPC .................................... *B66C 23/88* (2013.01)

(58) Field of Classification Search
CPC .......... B66C 23/88; B66C 13/12; B66C 13/14
See application file for complete search history.

(56) References Cited

U.S. PATENT DOCUMENTS

2012/0023920 A1 2/2012 Kloft et al.
2018/0065834 A1 3/2018 Miyoshi

FOREIGN PATENT DOCUMENTS

CN 105438988 A 3/2016
CN 212318406 U 1/2021
CN 113371571 A 9/2021

OTHER PUBLICATIONS

CN 105438988A Machine Translation (Year: 2016).*
First search report cited in CN202410714112.7, mailed Oct. 14, 2024, 5 pages.
Notice of first Office action cited in CN202410714112.7, mailed Oct. 19, 2024, 9 pages.
Notification to Grant Patent cited in CN202410714112.7, mailed Oct. 31, 2024, 3 pages.
Wang Tianhui, "Improvement of Hoisting Brake System of Crane", Construction Machinery and Equipment, Apr. 30, 2011, pp. 56-58, No. 4.

* cited by examiner

*Primary Examiner* — Anna M Momper
*Assistant Examiner* — Juan J Campos, Jr.
(74) *Attorney, Agent, or Firm* — Cooper Legal Group, LLC

(57) ABSTRACT

An energy-saving hook fixing device for a crane is provided, including a hydraulic cylinder arranged at an end of the crane close to a hook, a hydraulic motor, an accumulator, and a directional control valve. A connector is provided at an end of a piston rod of the hydraulic cylinder away from a piston, the connector is used to connect to a cable, the cable is used to connect to the hook, and an inner cavity of the hydraulic cylinder is in communication with an oil tank of the crane. A drum is provided at an output end of the hydraulic motor, the drum is wound with a wire rope, and the wire rope is used to connect to the hook.

3 Claims, 2 Drawing Sheets

ENERGY-SAVING HOOK FIXING DEVICE FOR CRANE

CROSS-REFERENCE TO RELATED APPLICATIONS

This application claims priority to Chinese Patent Application No. 202410714112.7, filed on Jun. 4, 2024, the contents of which are hereby incorporated by reference.

TECHNICAL FIELD

The present disclosure relates to the technical field of engineering machinery, and in particular to an energy-saving hook fixing device for a crane.

BACKGROUND

Hooks are common lifting tools in lifting machinery. Every crane has at least one hook. The hook is often suspended on the wire rope of hoisting mechanisms by means of pulley blocks and other components. When moving a truck crane to a different site, it is necessary to retract the boom and hook together and fix the hook, i.e., use a cable to tighten the hook and hang the hook in a position slightly below the front of the cab to prevent excessive swinging that could cause accidental injuries.

However, due to the great mass of the hook, when connecting the cable, it generally relies on workers swinging the hook back and forth to find the right moment to insert the cable into the hook. This not only consumes physical effort but also requires high skills, posing risks of accidental injuries.

SUMMARY

An objective of the present disclosure is to provide an energy-saving hook fixing device for a crane, aiming to solve or improve at least one of the aforementioned technical problems.

To achieve the above-described objective, the present disclosure provides the following solution: the present disclosure provides an energy-saving hook fixing device for a crane, including a hydraulic cylinder arranged at an end of the crane close to a hook (i.e., the hydraulic cylinder is arranged at a front end of the crane), a hydraulic motor, an accumulator, and a directional control valve.

A connector is provided at an end of a piston rod of the hydraulic cylinder away from a piston, the connector is used to connect to a cable, the cable is used to connect to the hook, and a rodless cavity of an inner cavity of the hydraulic cylinder is in communication with an oil tank of the crane.

A drum is provided at an output end (i.e. a shaft) of the hydraulic motor, the drum is wound with a wire rope, and the wire rope is used to connect to the hook.

In a first working state, the wire rope is connected to the hook, an oil port of the accumulator is in communication with a first oil port (port T) of the directional control valve, a second oil port of (port A) the directional control valve is in communication with a first oil port (port P) of the hydraulic motor, and oil in the accumulator enters the hydraulic motor, so as to drive the hydraulic motor to rotate to retract the wire rope, and enable the hook to move toward the cable.

In a second working state, the connector is connected to the cable, the cable is connected to the hook, a rod cavity of the inner cavity of the hydraulic cylinder is in communication with the oil port of the accumulator, and the oil port of the accumulator is not communicated with the port P of the hydraulic motor; and when the hook swings, the piston rod of the hydraulic cylinder is pulled, and oil in the rod cavity of the inner cavity of the hydraulic cylinder enters the accumulator by a movement of the piston of the hydraulic cylinder.

In some embodiments, a spring is provided inside the hydraulic cylinder, two ends of the spring respectively contact the piston and an end of the rod cavity of the inner cavity of the hydraulic cylinder.

In some embodiments, a sequence valve is arranged between the hydraulic cylinder and the accumulator, where a first oil port (port A) of the sequence valve is in communication with the rod cavity of the hydraulic cylinder via a pipeline, a second oil port (port B) of the sequence valve is in communication with an oil inlet of a third check valve via a pipeline, and an oil outlet of the third check valve is in communication with the oil port of the accumulator via a pipeline.

In some embodiments, a third oil port (port L) of the sequence valve is in communication with the oil tank via a pipeline.

In some embodiments, the pipeline between the rod cavity and the sequence valve is in communication with an oil outlet of a fourth check valve, and an oil inlet of the fourth check valve is in communication with the pipeline between the sequence valve and the third check valve.

In some embodiments, the oil tank is in communication with an oil inlet of a first check valve via a pipeline, an oil outlet of the first check valve is in communication with an oil inlet of a second check valve via a pipeline, and an oil outlet of the second check valve is in communication with a third oil port of the directional control valve via a pipeline.

In some embodiments, the pipeline between the oil tank and the first check valve is further in communication with the rodless cavity of the hydraulic cylinder via a pipeline (i.e., the rodless cavity of the hydraulic cylinder is connected to the oil tank via a pipeline), and the pipeline between the first check valve and the second check valve is further in communication with the pipeline between the sequence valve and the third check valve.

In some embodiments, the pipeline between the second check valve and the directional control valve is further in communication with a second oil port of the hydraulic motor via another pipeline, and a throttle valve is provided on the other pipeline.

In some embodiments, the connector is a joint with a pin hole or a hook.

In some embodiments, the oil port of the accumulator is in communication with an oil inlet of a relief valve, and an oil outlet of the relief valve is in communication with the oil tank.

The present disclosure discloses the following technical effects. During the movement of the crane, the swinging of the hook drives the cable to pull the piston rod of the hydraulic cylinder, causing the piston of the hydraulic cylinder to force the oil in the rod end of the hydraulic cylinder into the accumulator, thereby collecting the kinetic energy of the hook. When it is necessary to fix the hook to the cable, the hook connected to the wire rope is gradually moved closer to the cable. The oil in the accumulator may enter the hydraulic motor, so as to enable the hydraulic motor to withdraw the wire rope. Therefore, the recovery and reuse of the energy generated by the swinging of the hook are achieved during the movement of the crane vehicle, the fixing of the hook is assisted and the connection of the cable to the hook by the operator is facilitated, and labor intensity and the risk of accidental injuries are reduced.

BRIEF DESCRIPTION OF THE DRAWINGS

The accompanying drawings, which form part of the present disclosure, are intended to provide further understanding of the present disclosure. The schematic embodiments and descriptions of the present disclosure are used to explain the present disclosure and do not constitute improper limitations. In the drawings:

The FIG. 1 is a schematic diagram of an overall structure of an energy-saving hook fixing device for a crane according to the present disclosure.

Figure 2:
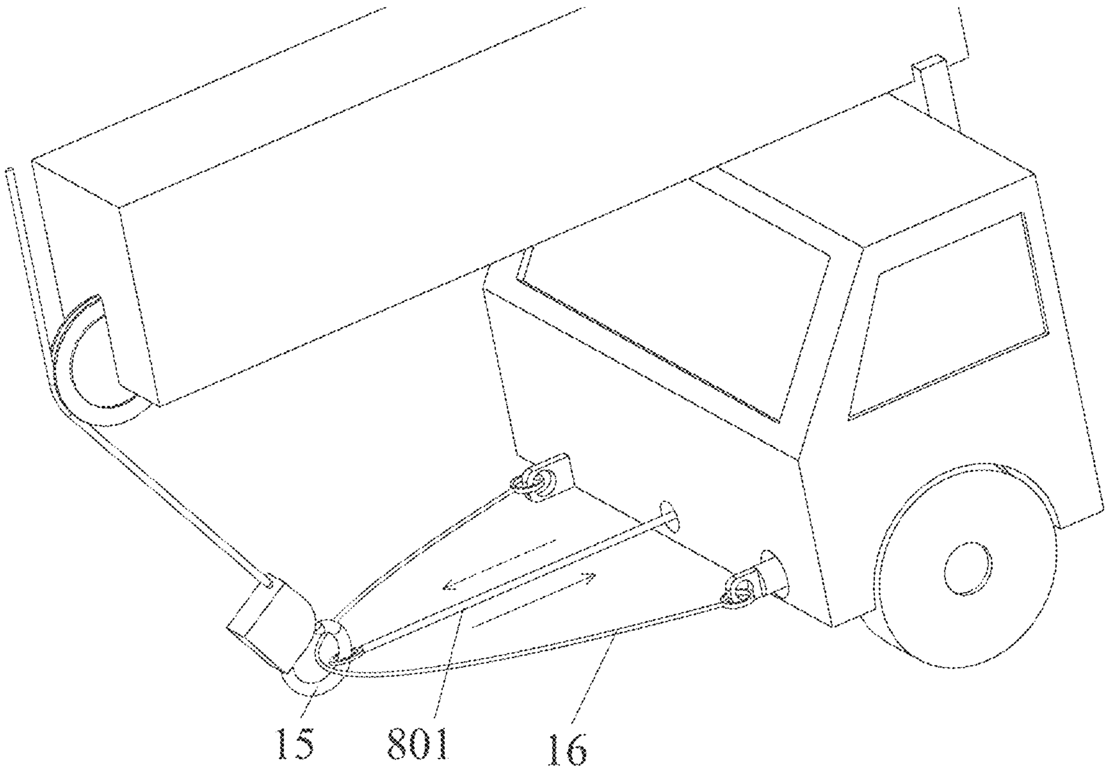

The FIG. 2 is a schematic diagram of the energy-saving hook fixing device installed on the crane according to the present disclosure.

DETAILED DESCRIPTION OF THE EMBODIMENTS

In the following, the technical solutions in the embodiments of the present disclosure will be clearly and completely described with reference to the attached drawings. Apparently, the described embodiments are only a part of the embodiments of the present disclosure, but not all the embodiments. Based on the embodiments in the present disclosure, all other embodiments obtained by one of ordinary skill in the art without creative effort belong to the protection scope of the present disclosure.

In order to make the above objects, features and advantages of the present disclosure more obvious and easier to understand, the present disclosure will be further described in detail with the attached drawings and specific embodiments.

Figure 1:
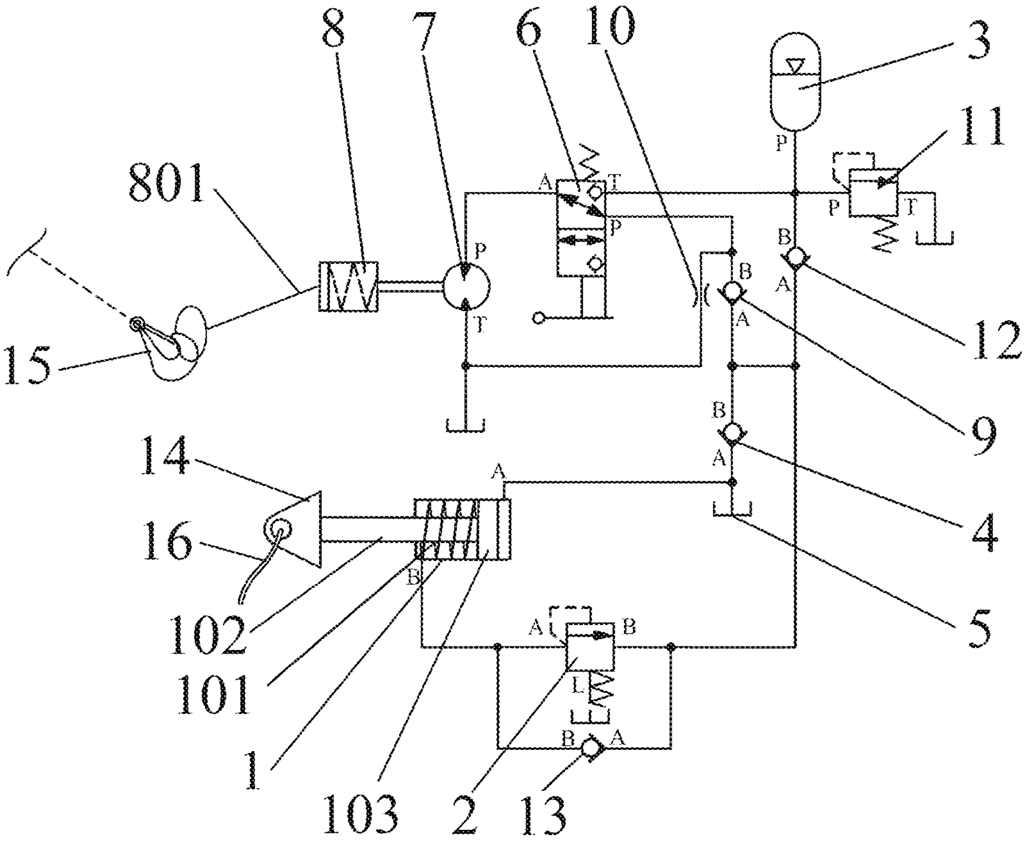

With reference to the FIGS. 1 and 2, the present disclosure provides an energy-saving hook fixing device for a crane, including a hydraulic cylinder 1 arranged at the front end of the crane close to a hook 15, a hydraulic motor 7, an accumulator 3, and a directional control valve 6.

A connector 14 is provided at the end of the piston rod 102 of the hydraulic cylinder 1 away from a piston 103, the connector 14 is used to connect to a cable 16, the cable is used to connect to the hook of a crane, and a rodless cavity of the inner cavity of the hydraulic cylinder 1 is in communication with the oil tank 5 of the crane.

A drum 8 is provided at the output end of the hydraulic motor 7, the drum 8 is wound with a wire rope 801, and the wire rope 801 is used to connect to the hook 15.

In a first working state, and in the upper position of the directional control valve 6, the oil outlet of the second check valve 9 is in communication with the third oil port of the directional control valve 6, the wire rope 801 is connected to a connecting device of the crane, the hook is connected to the connecting device, and the connecting device may be in the form of a hook or a ring. The wire rope 801 can be manually pulled and released as necessary, enabling the hook 15 to move towards the cable. In the lower position of the directional control valve 6, the oil port of the accumulator 3 is in communication with the first oil port of the directional control valve 6, the second oil port of the directional control valve 6 is in communication with the first oil port of the hydraulic motor 7, and the oil in the accumulator 3 enters the hydraulic motor 7, driving the hydraulic motor 7 to retract the wire rope 801.

In a second working state, the directional control valve 6 is reset (i.e., the normal position), the connector 14 is connected to the cable, the cable is connected to the hook of the crane, a rod cavity of the inner cavity of the hydraulic cylinder 1 is in communication with the oil port of the accumulator 3 via the sequence valve 2 and the third check valve 12. In this condition, the oil port of the accumulator 3 is not communicated with the port P of the hydraulic motor 7. When the hook swings as the crane moves, the piston rod of the hydraulic cylinder 1 is pulled, and oil in the rod end of the hydraulic cylinder 1 enters the accumulator 3 via the sequence valve 2 and the third check valve 12.

During the movement of the crane, the swinging of the hook pulls the piston rod of the hydraulic cylinder 1 via the cable, causing the piston of the hydraulic cylinder 1 to force the oil in the inner cavity of the hydraulic cylinder 1 into the accumulator 3 via the sequence valve 2 and the third check valve 12, thereby collecting the kinetic energy of the hook and storing in the accumulator 3 in a form of pressure energy. When it is necessary to fix the hook of the crane, the oil in the accumulator 3 goes into the hydraulic motor 7, and the hydraulic motor 7 withdraws the wire rope 801, thereby bringing the hook connected to the wire rope 801 gradually closer to the cable, achieving the recovery and reuse of the energy generated by the swinging of the hook of the crane when the crane moves. this disclosure could assist workmen in fixing the hook of a crane and facilitating the connection of the cable to the hook, thereby reducing labor intensity and the risk of accidental injuries.

In an embodiment, a spring 101 is provided inside the hydraulic cylinder 1, two ends of the spring 101 connected to the piston and the end of the rod cavity of the inner cavity of the hydraulic cylinder 1, respectively.

The spring 101 is arranged in the rod cavity of the hydraulic cylinder. In the natural state, the piston rod of the hydraulic cylinder 1 is in a retracted state under the action of the spring 101.

In an embodiment, a sequence valve 2 and a third check valve 12 are arranged in tandem between the hydraulic cylinder 1 and the accumulator 3, the first port (port A) of the sequence valve 2 is connected to the rod end of the hydraulic cylinder 1 via a pipeline, the second port (port B) of the sequence valve 2 is connected to the inlet of the third check valve 12 via a pipeline, and the outlet of the third check valve 12 is connected to the port of the accumulator 3 via a pipeline.

During the extending stroke of the hydraulic cylinder 1, the oil in the rod end is directed into the accumulator 3 via the sequence valve 2, the third check valve 12 and the pipelines. The sequence valve 2 is an internally controlled and externally drained sequence valve, which may keep the tension force of the cable be constant.

In an embodiment, the third port of the sequence valve 2 is connected into the oil tank 5 via a pipeline, and the third oil port of the sequence valve 2 is the drain port (port L) of the sequence valve. In this embodiment, the multiple graphic symbols labeled as oil tanks in the FIG. 1 all correspond to the same physical oil tank.

In an embodiment, a fourth check valve 13 is arranged in parallel with the sequence valve 2, specifically, the inlet of the fourth check valve is connected to the outlet of the sequence valve, and the outlet of the fourth check valve is connected to the inlet of the sequence valve. The oil tank 5 is connected to the inlet of a first check valve 4 via a pipeline, the outlet of the first check valve 4 is connected to the inlet of a second check valve 9 via a pipeline, and the outlet of the second check valve 9 is connected to the third port (port P) of the directional control valve 6 via a pipeline. The pipeline between the oil tank 5 and the first check valve 4 is further connected to the blank end (i.e., the rodless cavity) of the hydraulic cylinder 1 via a pipeline, and the pipeline between the first check valve 4 and the second check valve 9 is further connected to the pipeline between the sequence valve 2 and the third check valve 12. The pipeline between the second check valve 9 and the directional control valve 6 is further connected to the second port of the hydraulic motor 7 via a pipe, and a throttle valve 10 is provided on this pipe.

So, the rodless cavity of the hydraulic cylinder 1 is directly in communication with the oil tank 5, and the rod cavity of the hydraulic cylinder 1 in communication with the oil tank via the fourth check valve 13 and the first check valve 4. The pipelines communicated with the rodless cavity of the hydraulic cylinder 1, the oil tank 5, the first check valve 4, the fourth check valve 13 and the rod cavity of the hydraulic cylinder 1 form a circuit, which will replenish oil for the rod cavity the hydraulic cylinder 1.

The pipelines communicated with the hydraulic motor 7, the second oil port of the directional control valve 6, the third oil port of the directional control valve 6, and the throttle valve 10 form a loop for replenishing the oil to the hydraulic motor 7 when releasing the wire rope 801. At the same time, the pipelines in communication with the oil tank 5, the first check valve 4, the second check valve 9, and the throttle valve 10 may also replenish oil to the hydraulic motor 7.

In an embodiment, the connector 14 is a joint with a pinhole or a hook.

In an embodiment, the oil port of the accumulator 3 is in communication with the oil inlet of a relief valve 11, and the oil outlet of the relief valve 11 is in communication with the oil tank 5, the relief valve 11 is placed between the accumulator 3 and the oil tank 5.

The principle of the directional control valve 6 is as follows.

The directional control valve 6 is preferably a manually actuated, two-position, three-way directional control valve.

In the first working state, the wire rope 801 is manually pulled out, the directional control valve 6 is in its original (upper) position, as shown in the FIG. 1. The first port of the directional control valve 6 is closed, and the second port of the directional control valve 6 is connected to the third port of the directional control valve 6. When the wire rope 801 is going to be retracted, the directional control valve 6 should be switched to the lower position. The first port of the directional control valve 6 is connected to the second port of the directional control valve 6, and the third port of the directional control valve 6 is closed. Specifically, when the hydraulic motor admits oil at port P and drains oil at port T, the motor drives the drum 8 to wind up the wire rope 801. When the wire rope 801 is manually pulled, the drum drives the hydraulic motor to rotate. Consequently, port T of the hydraulic motor functions as the oil inlet, drawing oil from the oil tank, and port P serves as the oil outlet. The oil then flows from the port A of the directional control valve 6 to port P and is directed back to the oil tank through the throttle valve 10. The throttle valve 10 mainly functions to create resistance in the flow of oil from the port P of the hydraulic motor, through the port A to the port P of the directional control valve 6, and the throttle valve to the port T of the hydraulic motor, thereby preventing the wire rope 801 from being easily pulled out and loosened.

The working principle of the device in the embodiment is as follows.

The energy-saving hook fixing device of the present disclosure is installed on the crane, and the hook 15 is suspended on the crane, as shown in FIG. 2.

In the first working state of the device, the wire rope 801 on the drum 8 is manually pulled to a suitable length, so as to reach the hook 15 suspended on the crane, and the wire rope 801 is connected to the hook 15. Specifically, the wire rope 801 is pulled to drive the drum 8 and hydraulic motor 7, forming a certain vacuum at the second oil port of the hydraulic motor 7. The oil in the oil tank 5 flows into the second port (T port) of the hydraulic motor 7. At the same time, the directional control valve 6 stays in the upper position, the oil flowing out from the first port of the hydraulic motor 7 passes through the second port of the directional control valve 6 to the third port of the directional control valve 6 and the throttle valve 10, entering the second port of the hydraulic motor 7.

After the wire rope 801 is connected to the hook 15, the wire rope 801 is withdrawn and wound, so as to drive the hook 15 to approach the cable 16. The directional control valve 6 is manually controlled to operate in the lower position. The oil from the accumulator 3 flows out, passing through the first oil port (port T) of the directional control valve 6 to the second oil port (port A) of the directional control valve 6, and then into the first oil port (port P) of the hydraulic motor 7. The oil flows back to the oil tank 5 from the second oil port (port T) of the hydraulic motor 7, and the hydraulic motor 7 drives the drum 8 to withdraw the wire rope 801. When the hook is close to the cable, the operator may hang or fix the hook 15 onto the cable 16 connected to the connector 14, the connection between the wire rope 801 and the hook 15 may be removed.

If necessary, continue operating the directional control valve 6 to withdraw and wind up the wire rope 801 on the drum 8. When the wire rope 801 is wound to the appropriate position, the directional control valve 6 is reset, and the hydraulic motor 7 stops rotating.

In the second working state, the hook 15 is connected to the cable 16. During vehicle movement, due to factors such as braking, uneven road surfaces, or steering, the hook of the crane connected to the cable inevitably swings. When the hook exerts a pulling force on the hydraulic cylinder 1 via the cable, the piston rod of the hydraulic cylinder 1 is pulled out, and the oil in the rod cavity of the hydraulic cylinder 1 flows out, while the rodless cavity of the hydraulic cylinder 1 is replenished with oil from the oil tank 5. The oil from the rod cavity of the hydraulic cylinder 1 passes through the first oil port of the sequence valve 2 to the second oil port of the sequence valve 2 and enters the accumulator 3 through the third check valve 12. During this process, some oil flows to the oil tank from the rod cavity through the second check valve 9. Due to the relatively small throttling effect of the throttle valve 10, more oil flows into the accumulator than into the oil tank. When the pulling force decreases, the piston rod of the hydraulic cylinder 1 resets under the action of the built-in spring 101, and the oil in the oil tank 5 enters the rod cavity of the hydraulic cylinder 1 via the first check valve 4 and the fourth check valve 13 under atmospheric pressure.

The above process is repeated multiple times during vehicle movement, allowing the accumulator 3 to collect a significant amount of energy.

Additionally, since the sequence valve 2 is set to a preset pressure and the built-in spring 101 in the hydraulic cylinder 1 has a certain preload, the tension of the cable must reach a certain value to cause the piston rod to move.

In the description of the present disclosure, it should be understood that the terms "longitudinal", "transverse", "up", "down", "front", "back", "left", "right", "vertical", "horizontal", "top", "bottom", "inside", "outside", etc. indicate orientation or positional relationships based on the orientation or positional relationships shown in the accompanying drawings, only for the convenience of describing the present disclosure, and do not indicate or imply that the device or element referred to must have a specific orientation, be constructed and operated in a specific orientation, and therefore cannot be understood as a limitation of the present disclosure.

The above-mentioned embodiments only describe the preferred mode of the present disclosure, and do not limit the scope of the present disclosure. Under the premise of not departing from the design spirit of the present disclosure, various modifications and improvements made by one of ordinary skill in the art to the technical solution of the present disclosure should fall within the protection scope of the present disclosure.

What is claimed is:

1. An energy-saving hook fixing device for a crane, comprising: a hydraulic cylinder arranged at an end of the crane close to a hook, a hydraulic motor, an accumulator, and a directional control valve;

wherein a connector is provided at an end of a piston rod of the hydraulic cylinder away from a piston, the connector is used to connect to a cable, the cable is used to connect to the hook, and a rodless cavity of an inner cavity of the hydraulic cylinder is in communication with an oil tank of the crane;

a drum is provided at an output end of the hydraulic motor, the drum is wound with a wire rope, and the wire rope is used to connect to the hook;

in a first working state, the wire rope is connected to the hook, an oil port of the accumulator is in communication with a first oil port of the directional control valve, a second oil port of the directional control valve is in communication with a first oil port of the hydraulic motor, and oil in the accumulator enters the hydraulic motor, so as to drive the hydraulic motor to retract the wire rope, and enable the hook to move toward the cable;

in a second working state, the connector is connected to the cable, the cable is connected to the hook, a rod cavity of the inner cavity of the hydraulic cylinder is in communication with the oil port of the accumulator, and the oil port of the accumulator is disconnected from the first oil port of the directional control valve; and when the hook swings, the piston rod of the hydraulic cylinder is pulled, and oil in the rod cavity of the inner cavity of the hydraulic cylinder enters the accumulator by a movement of the piston of the hydraulic cylinder;

a spring is provided inside the hydraulic cylinder, wherein two ends of the spring are respectively connected to the piston and an end of the rod cavity of the inner cavity of the hydraulic cylinder;

a sequence valve is arranged between the hydraulic cylinder and the accumulator, wherein a first oil port of the sequence valve is in communication with the rod cavity of the hydraulic cylinder via a pipeline, a second oil port of the sequence valve is in communication with an oil inlet of a third check valve via a pipeline, and an oil outlet of the third check valve is in communication with the oil port of the accumulator via a pipeline;

a third oil port of the sequence valve is in communication with the oil tank via a pipeline;

the pipeline between the rod cavity and the sequence valve is in communication with an oil outlet of a fourth check valve, and an oil inlet of the fourth check valve is in communication with the pipeline between the sequence valve and the third check valve;

the oil tank is in communication with an oil inlet of a first check valve via a pipeline, an oil outlet of the first check valve is in communication with an oil inlet of a second check valve via a pipeline, and an oil outlet of the second check valve is in communication with a third oil port of the directional control valve via a pipeline;

the pipeline between the oil tank and the first check valve is further in communication with the rodless cavity of the hydraulic cylinder via a pipeline, and the pipeline between the first check valve and the second check valve is further in communication with the pipeline between the sequence valve and the third check valve; and the pipeline between the second check valve and the directional control valve is further in communication with a second oil port of the hydraulic motor via another pipeline, and a throttle valve is provided on the other pipeline.

2. The energy-saving hook fixing device for the crane according to claim 1, wherein the connector is a joint with a pin hole or a hook.

3. The energy-saving hook fixing device for the crane according to claim 1, wherein the oil port of the accumulator is in communication with an oil inlet of an overflow valve, and an oil outlet of the overflow valve is in communication with the oil tank.

* * * * *